(12) United States Patent
Kavousian

(10) Patent No.: US 10,371,517 B2
(45) Date of Patent: Aug. 6, 2019

(54) DEVICE AND METHOD FOR MEASURING THE STRAIGHTNESS OF A ROD-LIKE WORK PIECE

(71) Applicant: MSG Maschinenbau GmbH, Schmallenberg (DE)

(72) Inventor: Arshad Kavousian, Bad Berleburg (DE)

(73) Assignee: MSG Maschinenbau GmbH, Schmallenberg (DE)

( * ) Notice: Subject to any disclaimer, the term of this patent is extended or adjusted under 35 U.S.C. 154(b) by 178 days.

(21) Appl. No.: 15/477,217

(22) Filed: Apr. 3, 2017

(65) Prior Publication Data

US 2017/0284798 A1 Oct. 5, 2017

(30) Foreign Application Priority Data

Apr. 2, 2016 (DE) ........................ 10 2016 003 772

(51) Int. Cl.
| | |
|---|---|
| *G01B 5/20* | (2006.01) |
| *G01B 21/32* | (2006.01) |
| *B23Q 17/20* | (2006.01) |
| *G01B 11/26* | (2006.01) |
| *G01B 5/25* | (2006.01) |
| *G01B 11/24* | (2006.01) |
| *G01L 5/00* | (2006.01) |

(52) U.S. Cl.
CPC ............. *G01B 21/32* (2013.01); *B23Q 17/20* (2013.01); *G01B 5/20* (2013.01); *G01B 5/25* (2013.01); *G01B 11/24* (2013.01); *G01B 11/26* (2013.01); *G01L 5/0038* (2013.01)

(58) Field of Classification Search
CPC ............... G01B 3/12; G01B 5/20; G01B 5/25
See application file for complete search history.

(56) References Cited

U.S. PATENT DOCUMENTS

| 4,154,073 A | 5/1979 | Galdabini |
| 2010/0088043 A1 | 4/2010 | Weiss et al. |

FOREIGN PATENT DOCUMENTS

| CN | 104558447 A | 4/2015 | |
| DE | 2207336 A1 | 8/1973 | |
| DE | 19706622 A1 | 8/1998 | |
| DE | 102011119658 B4 | 5/2013 | |
| DE | 102014104337 B3 | 7/2015 | |
| EP | 0414036 A2 * | 2/1991 | ............... B21D 3/10 |

\* cited by examiner

*Primary Examiner* — Jamel E Williams
(74) *Attorney, Agent, or Firm* — Howard IP Law Group

(57) ABSTRACT

A device for measuring the straightness of a rod-like work piece includes a support for the rod-like work piece. The support has multiple sections, each of which has a support surface. At least one force sensor is provided to measure the force applied by the work piece onto the support surface in a direction that extends essentially transverse to gravitational acceleration.

20 Claims, 3 Drawing Sheets

DEVICE AND METHOD FOR MEASURING THE STRAIGHTNESS OF A ROD-LIKE WORK PIECE

CROSS-REFERENCE TO RELATED APPLICATIONS

This application claims priority pursuant to 35 U.S.C. 119(a)-(d) to German Application No. 10 2016 003 772.5 filed Apr. 2, 2016, the entire contents of which are incorporated herein by reference for all purposes.

FIELD OF THE INVENTION

The invention concerns a device for measuring the straightness of a rod-like work piece, comprising a support for the rod-like work piece, as well as a method for measuring the straightness of a rod-like work piece.

BACKGROUND OF THE INVENTION

The straightness of rod-like work pieces is a quality characteristic that may be of vital importance for the demands made on the work piece. In the past the straightness of a rod-like work piece, in particular that of a straightened pipe, was verified by visual judgement, which left the straightness measurement to the subjective perception of the person taking the measurement. Moreover, methods are known in which the straightness of a rod-like work piece was measured by way of mechanical scanning or through comparison with templates.

A method and a device for examining pipes is known from DE 10 2011 119 658 B4, in which the roundness and straightness of a pipe is checked using a non-contacting, optical method. The device comprises a support means for the pipe to be checked, and a portal that is arranged around the support means. The portal determines a portal plane that extends transverse to the longitudinal direction of the support means, wherein multiple optical roundness sensors are provided around the circumference of the portal, which are distributed in a transverse plane and are directed at the center of the portal, where said roundness sensors are used to take measurements of circumferential segments of the pipe. Moreover, the device comprises means with which the portal together with all sensors is moveable and adjustable transverse to the longitudinal direction of the support means in such a way, that the center of the portal coincides with the axis of the pipe in order to set and adjust the portal to a diameter of the pipe that may be between a smallest possible and a largest possible diameter. Moreover, means are provided to enable a controlled move relative to each other of the portal, including all optical sensors as well as the pipe resting on the support means, in longitudinal direction of the support means.

The devices and methods for determining the straightness of pipes known per se are elaborate and/or flawed due to the interaction with external forces or stresses respectively since the existing inherent stresses can lead to a distortion of the measuring result when placing the pipe onto a support means.

SUMMARY OF THE INVENTION

It is the object of the present invention to provide a device and a method with which at least one of the above disadvantages can be overcome.

Said object is met by the embodiments described below. Multiple advantageous embodiments are described herein.

It is the object of the invention to provide a support for a rod-like work piece in which the influence of the dead weight of the rod-like work piece and that of external forces can be determined. It was recognized that if the forces applied by a rod-like work piece onto the support are taken into account, the straightness measurement is improved significantly. A distortion through existing forces that act upon the rod-like work piece from outside can be reduced if they are taken into account. In particular mechanical stresses in the work piece caused by resting on the support, which may lead to a "deformation" of the rod-like work piece, are taken into account and their effects are considered when determining straightness.

A device for measuring the straightness of a rod-like work piece is provided, which comprises a support for the rod-like work piece. The support includes a number of sections that each have a support surface. At least one force sensor is provided to measure the force applied by the rod-like work piece onto the support surface in a direction that is essentially transverse to gravitational acceleration.

At least one force sensor may be provided for each support surface. The force sensor is used to measure the force applied by the rod-like work piece onto the respective support surface.

The direction, which extends essentially transverse to the direction of gravitational acceleration, may, together with the longitudinal direction of the rod-like work piece, enclose an angle that is unequal to zero, and thus be unequal to the longitudinal direction of the rod-like work piece. As far as the longitudinal direction of the rod-like work piece is concerned, the longitudinal direction of the rod-like work piece corresponds essentially to the arrangement of the sections of the support, which may be placed in a row. The sections may be arranged in particular in a row in accordance with the longitudinal direction of the rod-like work piece. The term "longitudinal direction of the rod-like work piece" may therefore correspond essentially to the "arrangement of the sections of the support in a row" or the "longitudinal extension of the support" respectively. The force sensor is able to measure a component of the force that extends transverse to the direction of gravitational acceleration, wherein said component may in particular act unequal to the longitudinal direction of the rod-like work piece.

Measuring the force at the sections of the support makes it possible to place the sections at a distance from each other, independent of the length of the work piece. The sections at which a force measurement takes place may also be used to rest the ends of the rod-like work piece. A device according to the invention is flexible and is able to measure varying lengths of rod-like work pieces.

Provision may be made that at least one of the support surfaces is moveable transverse to the direction of gravitational acceleration, wherein the movement has in particular at least one component that is unequal to the longitudinal direction of the rod-like work piece. The movability of the at least one support surface may be initiated by the placement of the rod-like work piece onto it when said rod-like work piece shows a plastic deformation, for example, which acts in the corresponding direction transverse to gravitational acceleration. The above-mentioned movement provided in addition to the force measurement may reduce the forces applied on the support surface by the rod-like work piece.

According to the invention the term "measurement of straightness" or "the measuring of straightness" respectively means the examination of the straightness of the rod-like work piece. The measurement of straightness or the measuring of straightness respectively may in particular include the determination of the circumferential contour of the rod-like work piece, so that at least one partial section of the rod-like work piece may be mapped from outside. According to the invention, in particular at least one partial section of the outer contour of the rod-like work piece may be mapped three-dimensionally. Provision may be made that the rod-like work piece is measured three-dimensionally in its entirety from outside and illustrated. Logging is also possible. The device provides the possibility to create a log for each measured rod-like work piece. The quality of the rod-like work piece is quickly determined for each work piece.

According to the invention the term "rod-like work piece" can mean a work piece of many different geometric shapes. A rod-like work piece may include a profile, a solid rod, a square profile, a polygonal profile, a round profile, an oval profile, open or closed profiles as well as combinations of said work piece shapes or in particular a pipe.

According to the invention the term "sections of a support" means areas that are used for placing a rod-like work piece while carrying out the measuring process. The sections may essentially be arranged in a row. The rod-like work piece may rest on a support surface of a section. The support surface may be fixed in space. The support surface may, in particular independent from other areas of the support, be moveable, in particular controlled through force or pressure and/or displacement-controlled, in particular essentially in the direction of gravitational acceleration. It is possible, for example, to control a section in order to compensate for weight. The support surface may be arranged at the end on a plunger or piston rod which, as a moveable part, is able to move with respect to a cylinder. The sections with the support surfaces may in particular also be moveable essentially in the direction of gravitational acceleration and may be force-controlled, pressure-controlled and/or displacement-controlled. The control system may be an automatic control system. Vibrations and/or oscillations of the rod-like work piece may be reduced by means of the moveable sections with the support surfaces.

The sections may be arranged in longitudinal direction of the support in fixed positions to each other. Adjacent sections may be located essentially at the same distance from each other. A distance in the range from 0.5 m to approximately 1.7 m is preferred.

The term "support surface" includes essentially any shape, including an essentially flat surface, on which the rod-like work piece may rest in sections. Other shapes are possible. For example a U or V-shape is possible, where the rod-like work piece can rest between the flanks of the U or V. The flanks may enclose in particular an angle of 90°; other angles are possible. There may be boundaries for the support surface that extend in longitudinal direction of the rod-like work piece and which are provided with a section that comprises at least a portion that rises up in the direction of gravitational acceleration. It may be taken into account that "rolling rods" can be measured as rod-like work pieces, which are able to roll from the support surface if the support surface has no particular provisions. The support surface may be designed such that sufficient static friction is provided between the rod-like work piece and the support surface. To achieve this, the support surface may be roughened and/or a corresponding material, in particular plastic, may be applied on it. The support surface may have a surface normal that extends essentially parallel to gravitational acceleration. The support surface may in particular be larger or the same as the diameter of the rod-like work piece. The size of the support surface may be chosen such that the support surface does not protrude over the maximum width of the rod-like work piece.

The term "gravitational acceleration" or "direction of gravitational acceleration" respectively is the direction of the earth gravitation field and coincides essentially with the direction of the acceleration of gravity or plumb line direction respectively. Deviations that are caused by, for example, the Coriolis force, are included in the tolerance range.

The term "transverse" as a directional statement or geometric statement respectively relative to a further direction includes the right angle, but also deviations from the same. The statement "transverse" includes an angle enclosed with the reference direction in the range from approximately 5° to 175°, preferably between approximately 20° and approximately 160°, more preferred between approximately 35° and approximately 145°, in particular preferred between approximately 50° and approximately 130°, exceptionally preferred between approximately 65° and approximately 115°, exceptionally and particularly preferred between approximately 70° and approximately 110°. The movement transverse to the direction of gravitational acceleration may take place along a first direction, wherein a further, second component in a further direction transverse to the direction of gravitational acceleration and transverse to the first direction is not excluded. According to the invention a force with a component can be measured that is directed transverse to the direction of gravitational acceleration and which is in particular unequal to the longitudinal direction of the rod-like work piece. The force measurement of a component that is directed essentially horizontal is possible, whereby said component does not (only) act in longitudinal direction of the rod-like work piece.

In a particularly preferred embodiment, the at least one force sensor is designed not only to determine the force applied by the rod-like work piece onto the support surface, but also to determine a force that acts essentially in the direction of gravitational acceleration. This makes it possible to improve the measurement result and to make the design of the device simple. It may also be provided that a further force sensor is present that can measure the force applied by the rod-like work piece onto the support surface that acts essentially in the direction of gravitational acceleration. It is also possible that two force sensors are provided, both of which measure components of the force in the stated direction, and with which, using the known arrangement as to how the force sensors are disposed relative to the support surface, the forces are determined, in particular mathematically, under consideration of the angles at which the force sensors take their measurements or how they are arranged respectively.

In the description the determination or calculation of a force by way of a force sensor in a stated direction includes also the possibility that the force sensor also recognizes a force in another direction, or the signal received by the force sensor may include a corresponding (further) component respectively. The determination or calculation may be achieved through multiple force sensors or through corresponding signals respectively to determine the force in a stated direction.

In a preferred embodiment the support surface may be pivot-mounted. The support surface may in particular be supported such that a cardanic mount or jointed mount is used. The support surface may be designed as the end section of a swinging strut that may be jointed at the end.

The support surface is oriented upwards as a support for the rod-like work piece and is provided with an articulated joint in the direction of gravitational acceleration or at an angle to gravitational acceleration respectively. In addition to that, or alternatively, the support surface may be moveably supported. The moveable support may be moveable in particular in two to each other orthogonal directions. The two directions may also form an angle that is unequal to 90°. The movability of the support surface may be along one plane. The movability of the support surface may also take place in such a way that the support surface moves along a spherical segment. A reduction of frictional forces may be preferred for the movement and support of the support surface, wherein a linear guide, in particular with an air bearing, is provided, for example. In addition or alternatively it may be provided that a magnetic field is used with the linear guide. In addition or alternatively it is also possible to use a roller bearing to reduce frictional forces.

In a particularly preferred embodiment the device is designed such that (a) the movement of and/or the force onto the support surface essentially transverse to the direction of gravitational acceleration is measured, and/or (b) the movement of and/or the force onto the support surface essentially in the direction of gravitational acceleration is measured, and/or the direction in which the support surface can be moved is measured. The movement may be measured by means of an optical device. The effect of the force may, for example, be measured with one or more force sensors in the section with the support surface. It is possible to use a load cell as a special form of force sensor or force transducer respectively. Because the movement of the support surface can be measured, a deformation, which may be caused for example by the geometry of the rod-like work piece and/or the material, may be determined, in particular mathematically, so as to compensate for, for example, influences of externally acting forces and gravitation. It is also possible to generate a characteristic curve recording to determine material characteristics such as the elastic modulus, for example.

According to the invention the device is designed such that (a) the force applied to the support surface essentially transverse to the direction of gravitational acceleration as well as in particular unequal to the longitudinal direction of the rod-like work piece is measured, and (b) the force applied to the support surface essentially in the direction of gravitational acceleration can be measured. The effect of the force may, for example, be measured by way of one or more force sensors in the section with the support surface. As a special form of a force sensor or force transducer respectively it is possible to use load cell. Because the force applied by the rod-like work piece on the support surface can be measured, a deformation, which may be caused for example by the geometry of the rod-like work piece and/or the material, may be determined, in particular mathematically, so as to compensate for or take into account respectively for example influences of externally acting forces and gravitation.

According to the invention the term "force sensor" includes a sensor that is able to measure a force applied to the support surface, in particular a force applied to the support surface essentially in the direction of gravitational acceleration and/or the direction in which the support surface can be moved in order to, for example, compensate for the weight of the rod-like work piece. The force sensor is in particular able to measure a component of a force that is applied by the rod-like work piece onto the support surface. Said component may act transverse to the direction of gravitational acceleration and in particular unequal to the longitudinal direction of the rod-like work piece. The force sensor used may be one of a number of different types of sensors. The force sensor may be selected from a group of strain gauges; elastic element force transducers, in particular S-shaped elastic elements where the bending measurement may take place in a central web; piezoelectric force transducers; electromagnetic force transducers and/or resistive force transducers.

Through one or more force sensors, which may in particular be provided in each section of the support, it is also possible to measure friction forces during movement of the support surface. A force acting on the support surface may be measured. In the event where a support surface extends against the rod-like work piece at a pre-set pressure, the force acting on a force sensor should be easy to calculate if the system behaves in an ideal manner. However, since there may be friction between a piston rod and a cylinder (in particular the so-called stick-slip-effect), it can occur that the system does not behave in an ideal manner at a pre-set pressure, that is, the piston rod sometimes sticks in the cylinder. Due to the measurements taken with the force sensors it is possible to know the effect of friction and take it into account mathematically in that the ideal (target) force is compared with the one measured by the force sensor. Through taking into account the force measured by the force sensor it is possible to control the supports without an automatic control system. In particular it is possible to control all sections of the support with the same force or the same pressure respectively, which may result from considering the mass or density respectively of the rod-like work piece and the elastic modulus of the material of the work piece.

It is also possible that the support extends in such a way in the direction of the rod-like work piece (essentially in the direction of gravitational acceleration) that a counterforce can be measured.

In a preferred embodiment the at least one of the sections can be extended with a predetermined pressure, essentially in the opposite direction of gravitational acceleration. This makes it possible to compensate for the own weight of the rod-like work piece, which acts on said section.

Alternatively or in addition to that it is possible that at least one of the sections are able to extend a distance, which is adjustable or can be pre-set respectively, essentially in the opposite direction of gravitational acceleration. This makes it possible to counteract the own weight of the rod-like work piece that rests on said section or to avoid effects by the same respectively.

In a particularly preferred embodiment all of the sections in which the rod-like work piece rests at least in part, is able to extend with essentially the same pre-set pressure and/or essentially the same distance essentially in the opposite direction of gravitational acceleration. This makes it possible to compensate for the own weight over the entire length of the rod-like work piece, which rests on the support.

In a particularly preferred embodiment the supports are not moveable, and the forces between the rod-like work piece resting on the support surface and the support surface itself are measured, wherein at least two components can be measured. That is, one component in the direction of gravitational acceleration and one component in transverse direction to gravitational acceleration, which may in particular also be unequal to the longitudinal direction of the rod-like work piece.

In a particularly preferred embodiment the two end sections of the support are designed to permit fastening of the rod-like work piece. According to the invention, fastening means that the rod-like work piece cannot move essentially transverse to the direction of gravitational acceleration. This may be achieved, for example, by a correspondingly formed support surface. The support surface of the end sections may in particular be designed U-shaped or V-shaped, which makes it possible that, transverse in essentially the direction of gravitational acceleration and transverse to the longitudinal direction of the rod-like work piece, contact surfaces are formed that are aligned opposite each other and with which the rod-like work piece is in contact. The term "aligned opposite" includes, according to the invention, surfaces or part sections of surfaces, the surface normal of which extend parallel or which enclose an angle of 90° to each other. At the end sections of the support it is also possible to measure the forces that act between the rod-like work piece and the support surface, wherein two components may be measured: one component in the direction of gravitational acceleration and one component in a direction transverse to gravitational acceleration, which may also be unequal to the longitudinal direction of the rod-like work piece.

In a particularly preferred embodiment, the end sections of the support as well as the other sections may be controlled or moved respectively in essentially the direction of gravitational acceleration, in particular by means of a piston rod/cylinder unit. Particularly preferred, the end sections are not particularly moveable in the direction transverse to gravitational acceleration. The end sections may be provided with an above-described force sensor with which a force applied to the support surface may be measured. The end sections may also be fixed in space.

As far as numbers are stated in the description and/or the claims, said number not only contains the specific value but also a range of an interval with boundary values, which result from the specific value ±10% or ±10°.

In a preferred embodiment at least one optical device is provided for the optical assessment of the rod-like work piece. An optical device for the optical assessment of the rod-like work piece may include a camera. Moreover, the optical device may comprise illuminating means with at least one or more light sources, which may in particular be LEDs, for illuminating the support. It is, for example, possible that the camera and the light source or the multiple light sources are provided as a unit that are directed towards the rod-like work piece or the support respectively. The optical device may be fastened to a mounting bracket of the device. The light source may be switched on continuously or intermittently, for example by supplying power only briefly. The device may have an attachment facility for the optical device and/or the light source. The attachment facility can ensure that the optical device and/or the light source remain, after calibration, at the distance and orientation with respect to the support of the rod-like work piece as it was adjusted during calibration.

In a preferred embodiment a reflector is provided in the vicinity of the support, in particular below the support, with which the optical assessment of the rod-like work piece by means of an optical device can be improved. The reflector may in particular be designed as a reflecting surface, which reflects the incident light back onto itself. The reflective surface may be provided with catadioptric glass beads. In a particularly preferred embodiment multiple reflectors may be provided.

It may also be provided that the optical device comprises a backlight.

It may also be provided that the orientation of the rod-like work piece in space is additionally or alternatively determined by means of a mechanical sensor.

The invention also provides a method for measuring the straightness of a rod-like work piece, wherein the work piece is placed onto a support with a support surface. According to the invention, the force applied by the rod-like work piece onto the support surface in a direction essentially transverse to gravitational acceleration is measured.

BRIEF DESCRIPTION OF THE DRAWINGS

The invention will now be explained in more detail by way of the exemplary embodiments shown in the drawings.

DETAILED DESCRIPTION

Figure 1:
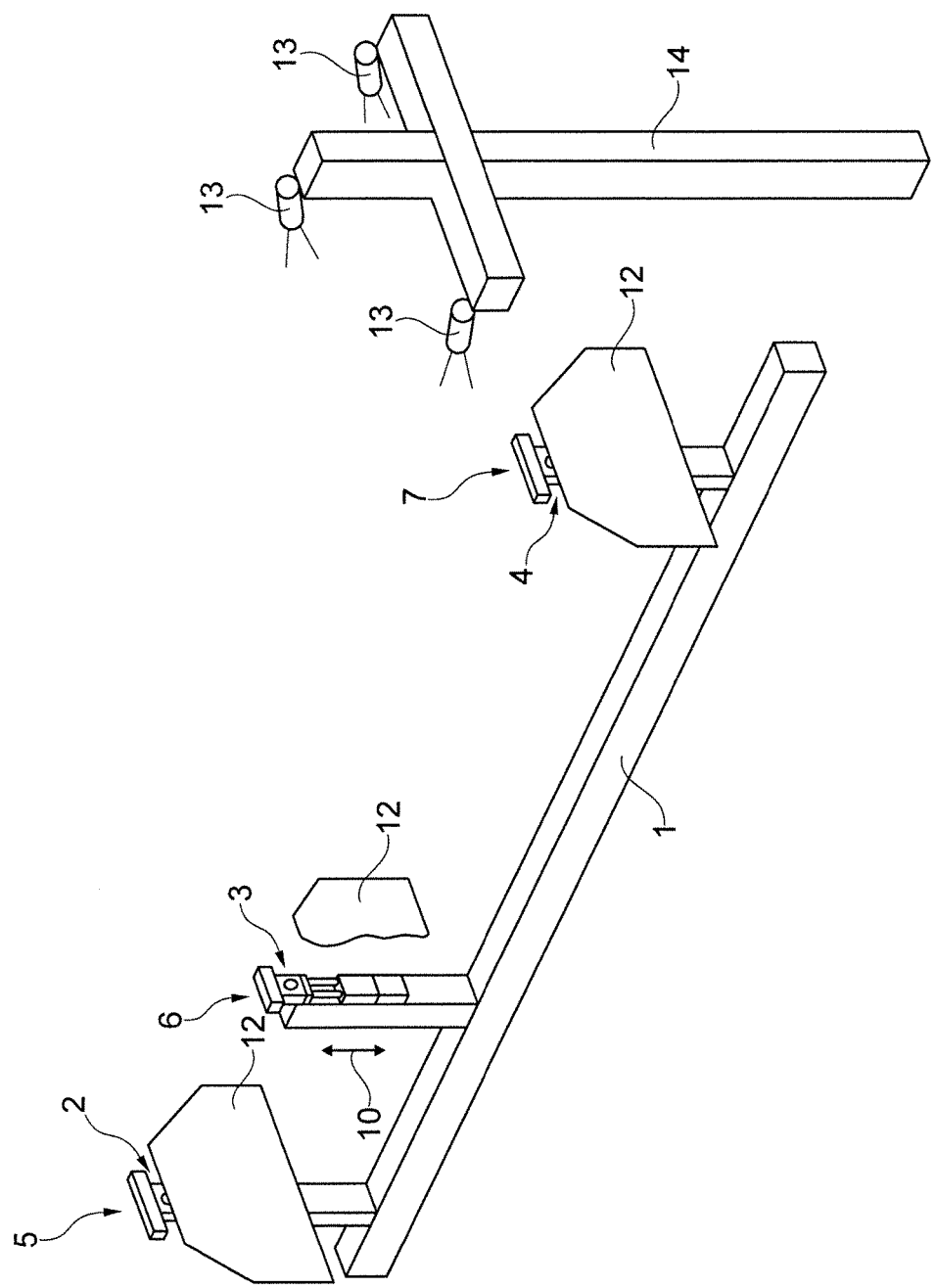
FIG. 1 shows a device for measuring the straightness of a rod-like work piece in isometric representation.

FIG. 1 depicts in isometric representation a device according to the invention in lateral view. A support for a rod-like work piece (not shown) is provided. The rod-like work piece may be placed in longitudinal extension of a beam 1, to which sections 2, 3, 4 are attached. The rod-like work piece may be oriented along the direction of the sections 2, 3, 4. The sections 2, 3, 4 of the support comprise support surfaces 5, 6, 7, which may come into contact with the rod-like work piece. The sections 2 and 4 are arranged in such a way and at such a distance from each other that an end section each of the rod-like work piece rests on section 2 and 4 respectively. However, the work piece to be measured may also be shorter so that the work piece may only rest on sections 2 and 3 or 3 and 4 respectively.

The surface areas 5, 6, 7 of the sections 2, 3, 4 are essentially flat, but they may also have a V-shape. The sections 2, 3, 4 may be moved in height, controlled by pressure, displacement and/or force. The support surfaces 5, 6, 7 of sections 2, 3, 4 are thus moveable in a direction essentially parallel to the direction of gravitational acceleration. The control of the movement in a direction essentially parallel to the direction of gravitational acceleration may be governed by the own weight of the rod-like work piece. A pressure may be set, in particular based upon a mass distribution of the rod-like work piece, that is, based upon the knowledge of the density of the rod-like work piece and the size of the support surfaces 5, 6, 7, with which the sections 2, 3, 4 may be extended in a direction essentially parallel to the direction of gravitational acceleration.

The support surfaces 5, 6, 7 of the sections 2, 3, 4 may, besides the possible movement in a direction essentially parallel to the direction of gravitational acceleration, also be moveable in a component transverse to the direction of gravitational acceleration.

At least one force sensor 8, 9 is disposed on the supports 2, 3, 4 (FIGS. 2 and 3), with which a force may be measured that is applied by the rod-like work piece onto the support surface 5, 6, 7 in a direction essentially transverse to the direction of gravitational acceleration. The at least one force sensor 8, 9 may be provided in particular for determining a force applied by the rod-like work piece onto the support surface 5, 6, 7 in a direction essentially transverse to the direction of gravitational acceleration and unequal to the longitudinal direction of the rod-like work piece.

Moreover, the force sensor 8, 9 may also be used to measure a force that is applied by the rod-like work piece onto support surface 5, 6, 7 in the direction of gravitational acceleration. The direction of gravitational acceleration is indicated essentially by the vertical double arrow 10 in FIG. 1. The movement transverse to the direction of gravitational acceleration is indicated by double arrow 11 (FIGS. 2 and 3).

Disposed below the support for the rod-like work piece are reflectors 12, which reflect light received from an optical device 13 back to the optical device 13. Multiple optical devices 13 are provided, which comprise at least one light source and one camera. Due to the illumination and the capture at different angles it is possible to form a three-dimensional picture of the rod-like work piece from the individual pictures taken by the cameras of the optical device 13. The optical devices 13 are attached to a framework 14, which comprises mounting brackets for the optical devices 13.

Figure 2:
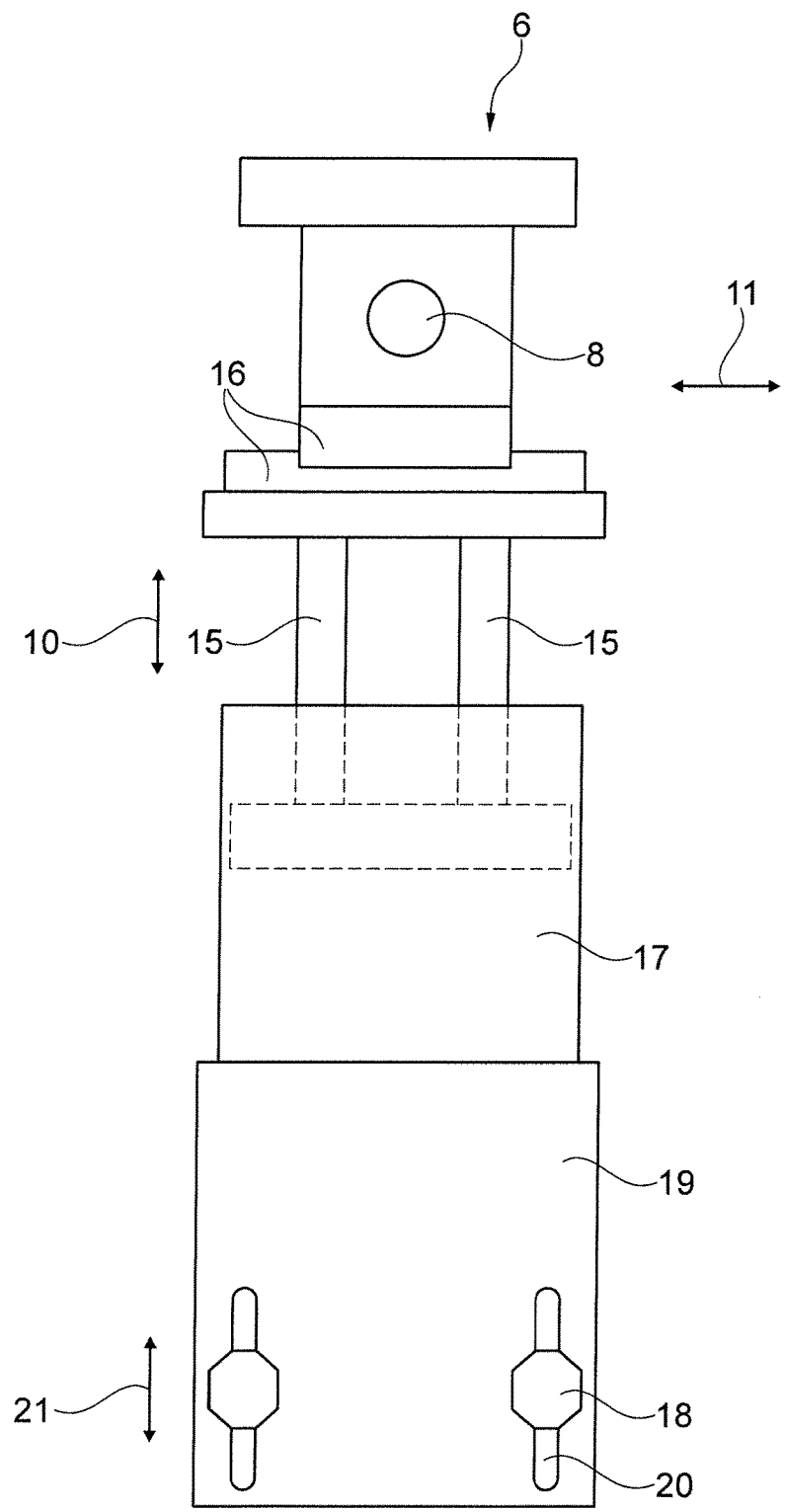
FIG. 2 shows a detailed diagram of a section with a support surface according to an embodiment in partial cross-section.
Figure 3:
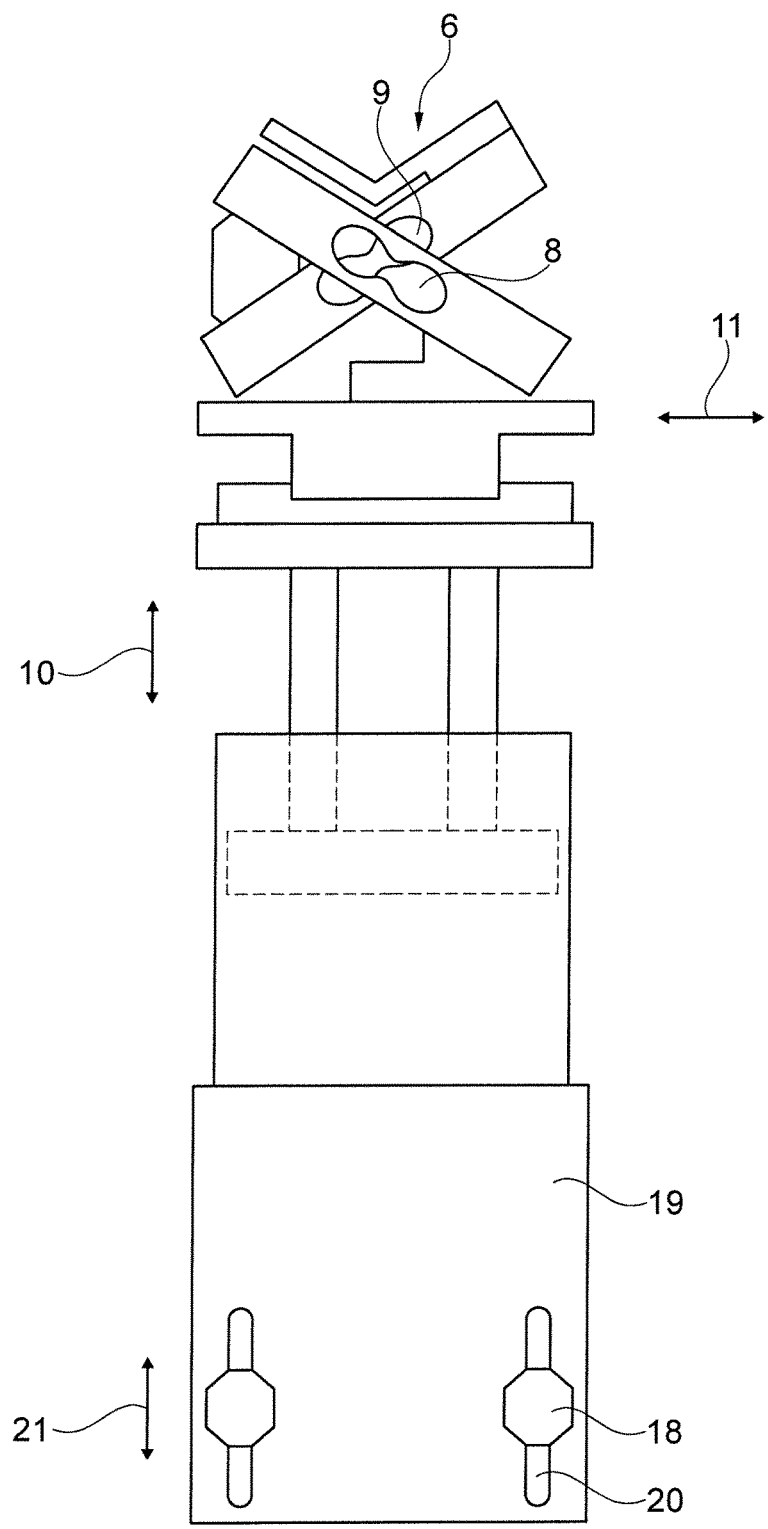
FIG. 3 shows a detailed diagram of a section with a support surface according to a further embodiment in partial cross-section.

FIG. 2 shows in a partial cross-section, as an example of one of sections 2, 3, 4, the section 3 of the support. The support surface 6 is linked with the force sensor 8 in such a way that a force applied by the work piece to the support surface 6 can be measured. The force sensor 8 allows the measurement of force components, which (a) act in the direction of gravitational acceleration and (b) in a direction transverse to gravitational acceleration. The component that acts in a direction transverse to gravitational acceleration may in particular be unequal to the longitudinal direction of the work piece.

Moreover, the support surface 6 is disposed on, or mounted to respectively, a piston rod 15, wherein a lateral movement by way of guide rails 16 is possible between the piston rod 15 and the support surface 6.

The piston rod 15 is displaceable by way of a cylinder 17. For the purpose of supplying compressed air to cylinder 17, said cylinder 17 comprises a cylinder inlet with a pressure control valve and a cylinder outlet, wherein the cylinder outlet is provided with an air regulator.

The cylinder 17 with piston rod 15 is attached to a guide piece 19. Said guide piece 19 is provided with guide slots 20 in form of perforations, through which the mounting screws 18 may extend, by means of which fastening at a predetermined height is possible, which is indicated by double arrow 21.

FIG. 3 depicts an alternative embodiment with a V-shaped support surface 6. Two force sensors 8, 9 are provided with which a force acting on the support surface 6 through the work piece may be measured. The force sensor 8, 9 allows the measurement of force components, which (a) act in the direction of gravitational acceleration and (b) in a direction transverse to gravitational acceleration. The component that acts in a direction transverse to gravitational acceleration may in particular be unequal to the longitudinal direction of the work piece. The embodiments for the design of the support surface 6 depicted in FIGS. 2 and 3 may be freely combined. Preconceptions and contradictory perceptions do not exist. The force sensor 8, 9 may in particular be used in any arrangement and design with which forces can be measured, which comprise components that act (a) in the direction of gravitational acceleration and (b) in a direction transverse to gravitational acceleration. The component that acts in a direction transverse to gravitational acceleration may in particular be unequal to the longitudinal direction of the work piece. The measurement of the forces both in the direction of gravitational acceleration as well as in a direction transverse to gravitational acceleration may be taken into consideration and may provide an improved result when measuring straightness.

A method according to the invention may be implemented in particular with the device shown in FIG. 1 and the sections of the support with the corresponding support surfaces shown in FIGS. 2 and/or 3. The rod-like work piece may initially be placed upon an additional support. The additional support may in particular be provided with sections that comprise a respective support surface. The additional support may have the purpose to protect in particular the support surfaces that are freely moveable in the direction essentially transverse to gravitational acceleration or to reduce the load respectively.

The sections of the additional support may in particular be oriented in the same direction as the support that comprises the aforementioned sections. Said aforementioned sections have a freely moveable support surface. The sections of the additional support may be retracted and the sections of the freely moveable support may be moved in the direction of the rod-like work piece, so that the sections of the additional support may no longer be in contact with the rod-like work piece, and the sections of the support that are freely moveable can come into contact with the rod-like work piece.

The invention claimed is:

1. A device for measuring a straightness of a rod-like work piece comprising:
   a beam;
   at least two support sections attached at different points of the beam, each of said at least two support sections including:
      a support surface configured to support a portion of the rod-like work piece;
      and a first sensor configured to measure a force that is applied by the rod-like work piece onto the respective support surface in a direction essentially transverse to a direction of gravitational acceleration;
   wherein the support surface of each of said at least two support sections is disposed on a piston rod within a cylinder, wherein the piston rod is configured to be displaced in a direction essentially opposite to the direction of gravitational acceleration by provision of compressed air to the cylinder.

2. The device of claim 1, wherein the cylinder is attached to a guide piece including guide slots for selecting a height of the guide piece.

3. A device for measuring a straightness of a rod-like work piece comprising:
   a beam;
   at least two support sections attached at different points of the beam, each of said at least two support sections including:
      a support surface configured to support a portion of the rod-like work piece;
      and a first sensor configured to measure a force that is applied by the rod-like work piece onto the respective support surface in a direction essentially transverse to a direction of gravitational acceleration;
   wherein the first sensor is configured to measure the force that is applied by the rod-like work piece onto the respective support surface in the direction essentially transverse to the direction of gravitational acceleration and unequal to a longitudinal direction of the rod-like work piece.

4. The device of claim 3, wherein each of the at least two support sections further includes a second sensor configured to measure the force applied by the rod-like work piece onto the respective support surface in essentially the direction of gravitational acceleration.

5. The device of claim 4, wherein the first sensor and the second sensor comprise a single sensor.

6. The device of claim 3, wherein at least one of the support surfaces is moveable transverse to the direction of gravitational acceleration such that at least one component of the force applied by the rod-like work piece onto the respective support surface is unequal to the longitudinal direction of the rod-like work piece.

7. The device of claim 3, wherein each support surface is one of pivot-mounted and moveably supported.

8. The device of claim 3, wherein at least one of the at least two support sections further include a fastener for fastening the rod-like work piece to the respective support surface.

9. The device of claim 3, further comprising at least one optical device configured to provide an optical assessment of the rod-like work piece.

10. The device of claim 3, wherein each of the at least two support sections further includes a reflector.

11. The device of claim 3, wherein the at least two support sections comprises at least three support sections, including a first support section supporting one end of the rod-like work piece, a third support section supporting another end of the rod-like work piece, and a second support section between the first support section and the third support section.

12. The device of claim 3, wherein the support surface of each of said at least two support sections is disposed on a piston rod within a cylinder, wherein the piston rod is configured to be displaced in a direction essentially opposite to the direction of gravitational acceleration by provision of compressed air to the cylinder.

13. The device of claim 12, wherein the cylinder is attached to a guide piece including guide slots for selecting a height of the guide piece.

14. A method for measuring a straightness of a rod-like work piece, comprising:
placing the rod-like work piece onto at least two support surfaces of at least two support sections attached at different points to a beam;
measuring, by a first sensor coupled to each of the at least two support surfaces, a force applied by the rod-like work piece to each of the at least two support surfaces in a direction essentially transverse to gravitational acceleration;
wherein measuring the force applied by the rod-like work piece to each of the at least two support surfaces comprises measuring the force applied by the rod-like work piece to each of the at least two support surfaces in the direction essentially transverse to the direction of gravitational acceleration and unequal to the longitudinal direction of the rod-like work piece.

15. The method of claim 14, further comprising measuring, by a second sensor coupled to each of the at least two support surfaces, a force applied by the rod-like work piece to each of the respective support surfaces in essentially the direction of gravitational acceleration.

16. The method of claim 14, further comprising moving at least one of the respective support surfaces transverse to the direction of gravitational acceleration such that at least one component of the force applied by the rod-like work piece onto the respective support surface is unequal to the longitudinal direction of the rod-like work piece.

17. The method of claim 14, further comprising moving one or more of support surfaces of the at least two support sections by actuating a piston attached to each respective support surface, wherein actuating the piston comprises applying one of pressure-control and displacement-control to a cylinder to which the piston is movably coupled.

18. The method of claim 14, further comprising mapping a partial section of an outer contour of the rod-like work piece by measuring the force applied by different sections of the rod-like work piece to each of the at least two support surfaces in the direction essentially transverse to gravitational acceleration.

19. The method of claim 14, further comprising mapping an entire exterior contour of the rod-like work piece by measuring the force applied by different sections of the rod-like work piece to each of the at least two support surfaces in the direction essentially transverse to gravitational acceleration.

20. The method of claim 19, further comprising generating a log of force measurements for each measured rod-like work piece.

* * * * *